US011619277B2

(12) United States Patent
Berry et al.

(10) Patent No.: US 11,619,277 B2
(45) Date of Patent: Apr. 4, 2023

(54) FLUID-FILLED FREQUENCY-TUNABLE VIBRATION DAMPER

(71) Applicant: United States of America as represented by the Administrator of NASA, Washington, DC (US)

(72) Inventors: Robert E. Berry, Madison, AL (US); Jeffrey L. Lindner, Madison, AL (US); W. Neill Myers, Huntsville, AL (US); John S. Townsend, Union Grove, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/113,440

(22) Filed: Aug. 27, 2018

(65) Prior Publication Data
US 2019/0353218 A1      Nov. 21, 2019

Related U.S. Application Data

(63) Continuation-in-part of application No. 15/982,864, filed on May 17, 2018.

(51) Int. Cl.
*F16F 7/10* (2006.01)
*F16F 9/096* (2006.01)
*F16F 9/06* (2006.01)

(52) U.S. Cl.
CPC ............ *F16F 7/1034* (2013.01); *F16F 9/065* (2013.01); *F16F 9/096* (2013.01); *F16F 2222/08* (2013.01); *F16F 2228/066* (2013.01)

(58) Field of Classification Search
CPC .. F16F 5/00; F16F 7/1034; F16F 7/112; F16F 7/10; F16F 15/023; F16F 15/0232; F16F 15/027; F16F 15/0275; F16F 2222/08; F16F 2228/066; E04H 2009/026
See application file for complete search history.

(56) References Cited

U.S. PATENT DOCUMENTS

| | | | | |
|---|---|---|---|---|
| 3,151,856 A | * | 10/1964 | Bresk | F16F 5/00 267/64.13 |
| 4,784,378 A | * | 11/1988 | Ford | F16F 13/08 267/140.11 |
| 5,070,663 A | * | 12/1991 | Sakai | E04B 1/985 52/167.1 |
| 5,775,637 A | * | 7/1998 | Vuillet | B64C 27/001 188/379 |

(Continued)

OTHER PUBLICATIONS

Ghisbain et al., Innovative Tuned Liquid Damper System, 19th IABSE Congress Stockholm, Challenges in Design & Construction of an Innovative & Sustainable Built Environ, Sep. 2016.

*Primary Examiner* — Nicholas J Lane
(74) *Attorney, Agent, or Firm* — Jerry L. Seemann; Trenton J. Roche (57) ABSTRACT

A frequency-tunable vibration damper includes a first container having rigid wall regions and compliant wall regions. A second container is coupled to the first container such that a wall region of the second container includes one of the compliant wall regions. A fluid fills the first container and a gas fills the second container. A flow restrictor is included in the second container and is spaced-apart from the one of the compliant wall regions included with the second container.

15 Claims, 6 Drawing Sheets

(56) References Cited

U.S. PATENT DOCUMENTS

| | | | |
|---|---|---|---|
| 2005/0012255 A1* | 1/2005 | Denk | B60G 17/0432 |
| | | | 267/64.15 |
| 2010/0083653 A1* | 4/2010 | Hawkins | F02G 1/043 |
| | | | 60/517 |
| 2010/0200348 A1* | 8/2010 | Reiterer | F16F 7/1034 |
| | | | 188/378 |
| 2018/0245337 A1* | 8/2018 | Malsch | E04B 1/985 |
| 2019/0061884 A1* | 2/2019 | Lepreux | B63B 35/44 |

* cited by examiner

FIG. 13

FLUID-FILLED FREQUENCY-TUNABLE VIBRATION DAMPER

CROSS-REFERENCE TO RELATED PATENT APPLICATIONS

This is a continuation-in-part of application Ser. No. 15/982,864, filed May 17, 2018.

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

1. Field of the Invention

This invention relates to vibration dampers. More specifically, the invention is a fluid-filled frequency-tunable vibration damper for coupling to structures subject to vibration motion that needs to be damped.

2. Description of the Related Art

Liquid-based turned mass dampers and tuned vibration absorbers are used for a variety of applications across a variety of industries. Two of the most well-known types of dampers/absorbers are a "tuned liquid damper" (TLD) and a "tuned liquid column damper" (TLCD), each of which will be described briefly below. These current state-of-the-art designs utilize the geometry of the damper's fluid container to set the frequency of mitigation with damping by loss mechanisms within the fluid.

Figure 1:
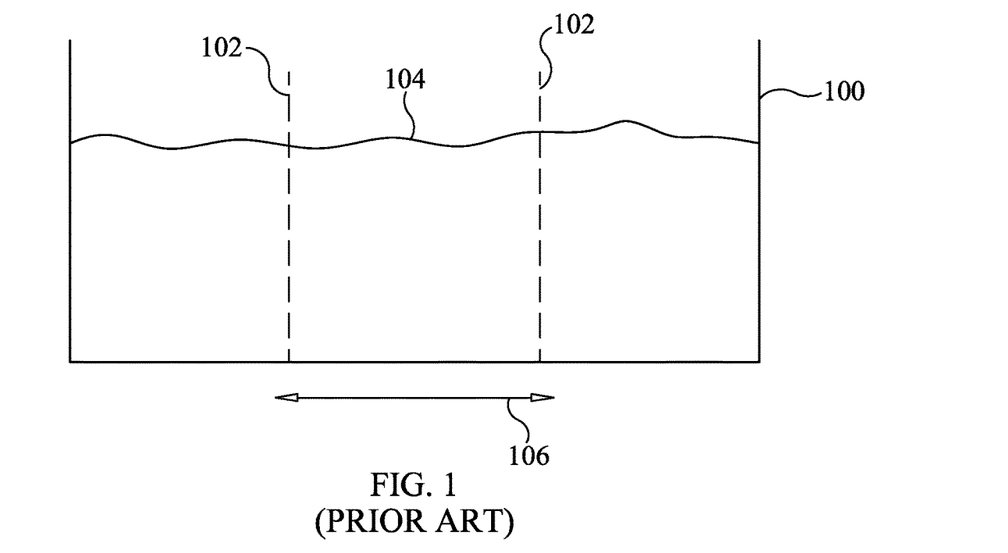
FIG. 1 is a schematic view of a prior art turned liquid damper.

A TLD, illustrated schematically in FIG. 1, includes an open-top tank 100 having baffles 102 disposed therein with tank 100 being partially filled with a liquid 104 such as water. When tank 100 is subjected to vibration/motion (indicated by two-headed arrow 106), liquid 104 sloshes back-and-forth within tank 100. Movement of fluid past baffles 102 provides a loss mechanism to damp vibration/motion 106. The size and shape of tank 100 determine the natural frequency of the sloshing action. Thus, increasing or decreasing the natural frequency of the system is difficult to accomplish since this can only be accomplished by physical modification of the container shape and/or size.

Figure 2:
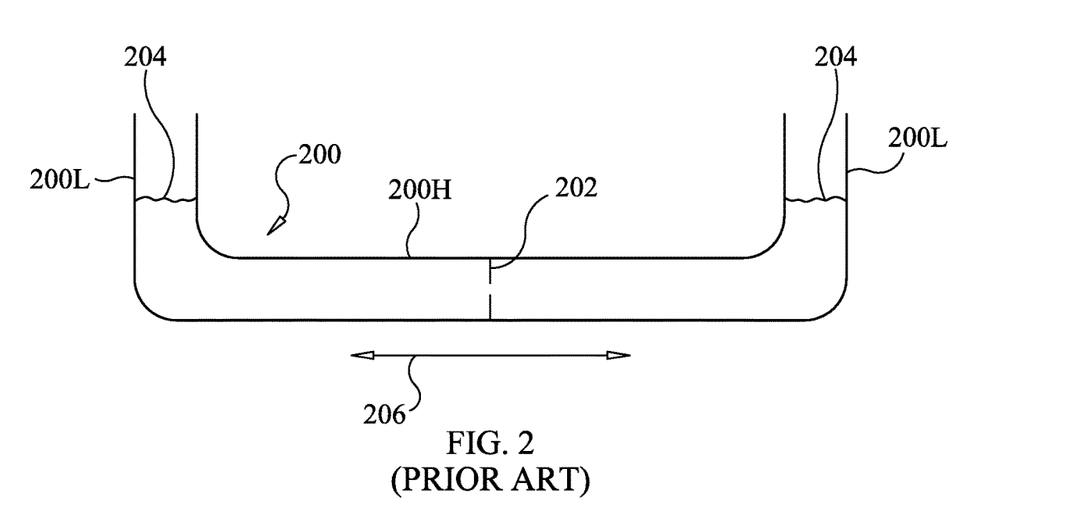
FIG. 2 is a schematic view of a prior art tuned liquid column damper.

A TLCD, illustrated schematically in FIG. 2, includes a U-shaped tube 200 having a flow restricting element 202 disposed therein with U-shaped tube 200 being partially filled with a liquid 204 such that liquid 204 extends part way up each vertical leg 200L of U-shaped tube 200. Similar to TLDs, the size and shape of tube 200 determine the natural frequency of any vibration-induced sloshing action of liquid 204. The total length of liquid 204 is the critical variable utilized to establish the system's natural frequency. In addition, the vertical-column portions of liquid 204 are parasitic and generally reduce the magnitude of the fluid reaction mass available for vibration mitigation. When U-shaped tube 200 is subjected to vibration/motion 206 aligned along the horizontal leg 200H of U-shaped tube 200, the controlled movement of liquid 204 through flow restricting element 202 damps vibration/motion 206.

For both of the above-described dampers, the systems' operating frequency is predominantly set by the geometry of the tank or tube, e.g., length of tank for TLD, length of liquid column for TLCD. While small adjustments to frequency on the order of ±10% can be achieved by creative tank/tube design, such changes affect system complexity and cost. Furthermore, larger changes in operating frequency are virtually impossible without a complete redesign of the system. Still further, the installation footprint needed for these dampers can be more than is available for many applications.

SUMMARY OF THE INVENTION

Accordingly, it is an object of the present invention to provide a frequency-tunable vibration damper.

Another object of the present invention is to provide a vibration damper adaptable for use with a variety of structures over a variety of vibration modes.

Other objects and advantages of the present invention will become more obvious hereinafter in the specification and drawings.

In accordance with the present invention, a frequency-tunable vibration damper includes a first container having rigid wall regions and compliant wall regions. At least a portion of the rigid wall regions is adapted to be coupled to a structure. A second container is coupled to the first container, wherein a wall region of the second container includes one of the compliant wall regions. A fluid fills the first container and a gas fills the second container. A flow restrictor is included in the second container and is spaced-apart from the one of the compliant wall regions included with the second container.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 3:
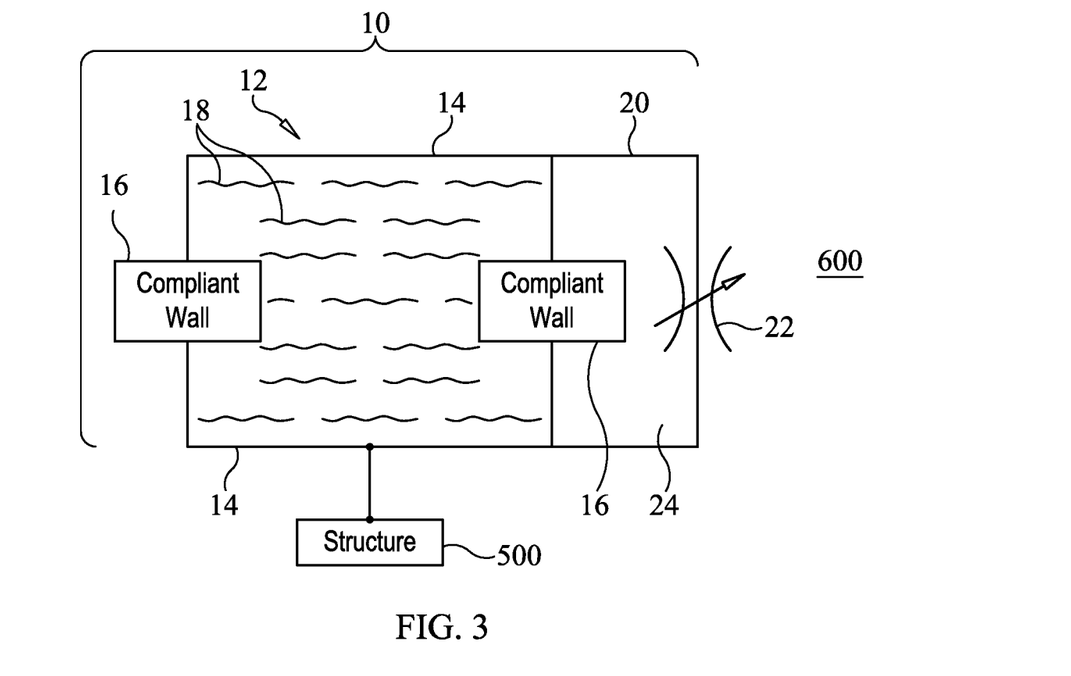
FIG. 3 is a schematic view of a fluid-filled frequency-tunable vibration damper in accordance with an embodiment of the present invention.

Referring again to the drawings and more particularly to FIG. 3, a fluid-filled frequency-tunable vibration damper in accordance with an embodiment of the present invention is shown and is referenced generally by numeral 10. In general, and as will be the case for all embodiments of the present invention, vibration damper 10 will be coupled to a structure 500 that is expected to experience vibration motion that needs to be damped. Structure 500 can be a static structure or moving structure without departing from the present invention. In addition, vibration damper 10, as well as each vibration damper embodiment described herein, is equipped to be tuned over a wide range of frequencies thereby allowing the present invention to be adapted to a variety of vibration modes of structure 500.

Vibration damper 10 includes a sealed container 12 having rigid walls 14 and compliant walls 16. Some or all of rigid walls 14 are coupled to structure 500 such that vibration motion of structure 500 is transferred to container 12. Rigid walls 14 can be made of metal, composites, or combinations thereof without departing from the scope of the present invention. Container 12 is completely filled with a fluid 18. While the particular choice of fluid 18 is not a limitation of the present invention, fluid 18 must remain fluid throughout all operating temperatures of vibration damper 10. Typically, fluid 18 can be pure water or water-based mixtures (e.g., salt water, water and an anti-freeze, etc.) thereby allowing the present invention to be easily constructed to be environmentally safe and cost-effective. However, other types of liquids can be used without departing from the scope of the present invention. Suitable liquids can also include food-based liquids such as milk or beer, as well as fuel-based liquids such as gasoline, kerosene, petroleum derivatives, general chemicals, and cryogenic fluids such as liquid oxygen and liquid hydrogen.

Fluid 18 could also be a gas such as helium, FREON, argon, oxygen, hydrogen, carbon dioxide, nitrous oxide, etc. The choice between using a liquid or a gas for fluid 18 can be predicated on, for example, the magnitude of reaction mass needed to mitigate the vibration of bulk mass system to which the vibration damper will be attached. In terms of non-limiting general guidelines, a liquid (for fluid 18) can be used for vibration mitigation of large bulk mass systems that typically resonate at a lower frequency, while gas (for fluid 18) can be used for vibration mitigation of smaller bulk mass systems that resonate at a higher frequency. However, it is to be understood that factors other than a system's problematic resonant frequency could dictate the choice between a liquid or a gas for fluid 18 without departing from the scope of the present invention. Examples of bulk mass systems well-suited for liquid-based vibration dampers include buildings, wind turbines, tanker trucks, transport trains, and ships, since problematic resonant frequencies for these types of systems are routinely below approximately 75 Hz. Examples of bulk mass systems well-suited for gas-based vibration dampers include gas turbine engines, internal combustion engines, gas flow pipes and ducts, air conditioning systems, pulse jet engines, musical instruments, and auditoriums, since problematic resonant frequencies for these systems are usually found above approximately 30 Hz. In cases where problematic resonant frequencies fall between 30 Hz and 75 Hz, liquid-based and/or gas-based vibration dampers could be used without departing from the scope of the present invention.

Rigid walls 14 and compliant walls 16 work together to keep container 12 completely sealed and, therefore, filled with fluid 18 at all times. At the same time, compliant walls 16 move or flex with movement of fluid 18 that is induced by movement of container 12 caused by vibration motion of structure 500. Although two compliant walls 16 are shown, additional ones could be included without departing from the scope of the present invention. In general, movement of a compliant wall away from container 12 causes at least one other compliant wall to move into container 12. Materials used for compliant walls 16 as well as the construction thereof can be varied without departing from the scope of the present invention. Several illustrative examples of compliant walls 16 will be provided later herein.

Coupled to container 12 is another container 20 such that one of the walls of container 20 includes one of compliant walls 16, hereinafter referred to as a shared one of compliant walls 16. Included as part of container 20 and spaced-apart from the shared one of compliant walls 16 is a flow restrictor 22 such as an adjustable valve or a structure that includes an adjustable valve. A gas 24 (e.g., air, helium) fills container 20. Flow restrictor 22 defines a gas flow path between the inside of container 20 and an ambient atmosphere 600. Additional examples of flow restrictors include single orifice or multi-hole orifice configurations, Variable Aperture Reciprocating Valves (VARRs), butterfly valves, gate valves, porous materials, mechanical venturis, flexible flaps, and reed valves.

Figure 4:
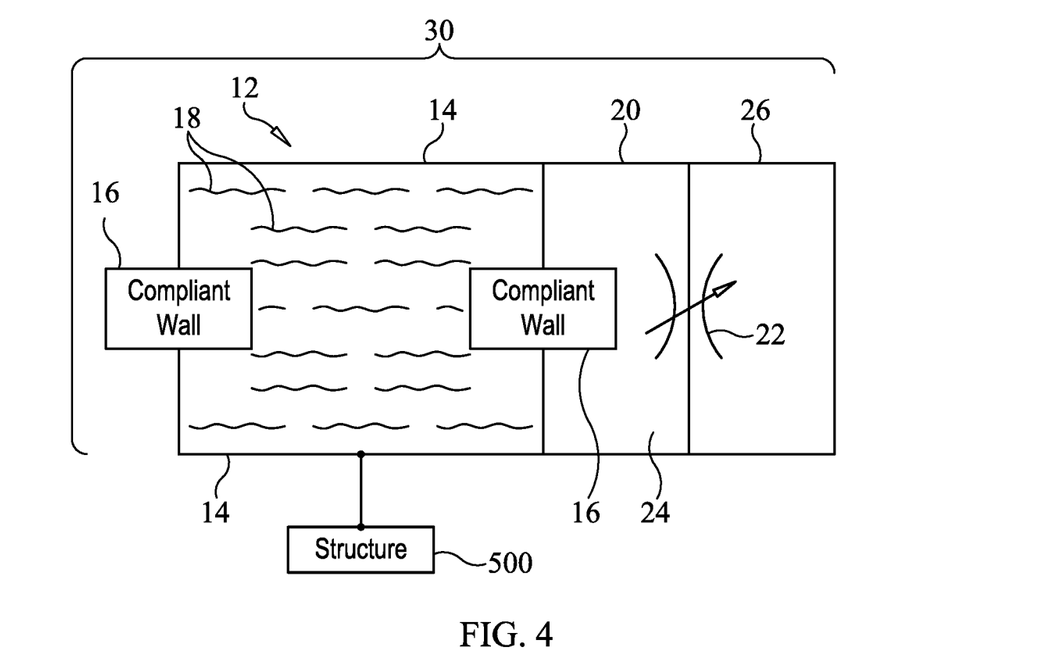
FIG. 4 is a schematic view of a fluid-filled frequency-tunable vibration damper in accordance with another embodiment of the present invention.

Another embodiment of a fluid-filled frequency-tunable vibration damper in accordance with the present invention is illustrated schematically in FIG. 4 and is referenced generally by numeral 30. Vibration damper 30 includes the elements of vibration damper 10 with container 20 further including a sealed chamber 26 such that flow restrictor 22 defines a gas flow path for gas 24 to move between the region of container 20 adjacent to the shared one of compliant walls 16 and sealed chamber 26. That is, gas 24 is on both sides of flow restrictor 22. Exemplary gases for gas 24 could include air as well as oxygen, helium, nitrogen, hydrogen, carbon dioxide, argon, and general refrigerants such as FREON.

The mechanism of vibration damping for both vibration dampers 10 and 30 is the same as will now be explained. Both systems contain a fluid mass, a mass suspension spring rate, and a damping mechanism. The fluid mass is the same for both vibration dampers 10 and 30. The spring rate is primarily determined by the stiffness of compliant walls 16 in vibration damper 10. Additional physical springs (not shown) can be included to stiffen the compliant walls to increase their overall natural frequency. For example, if the compliant walls were constructed as flexible bellows, the bellows' inherent stiffness could be supplemented with springs to increase their overall stiffness. For vibration damper 30, the addition of chamber 26 provides an additional spring adjustment capability. Chamber 26 can be very small or very large in volume. Chamber 26 provides exceptional damper tuning since it can be adjusted in size and/or gas pressure to generate a wide range of stiffness. For example, chamber 26 could be realized by a pipe with a movable pipe plug positioned therein such that the position of the plug determines the size of chamber 26. Another option is to provide a tank that was partially filled with water and partially filled with gas. Changing the amount of water would then change the amount of gas. The pressure of the contained gas can be used for additional tuning or as an alternative form of tuning. In general and advantageously, the size of container 12 can remain constant while allowing the frequency to be adjusted simply and quickly via adjustment of the spring constant provided by compliant walls 16 and/or that provided by chamber 26.

Vibration damping for both vibration dampers 10 and 30 is achieved in a similar fashion. The damping mechanism can be thought of as a resistive force that effectively resists the motion of the fluid mass and causes it to drag behind the structure's motion resulting in a "phase lag" between the structure's mass and the damper's fluid mass. Thus, the damping mechanism facilitates an optimum lag mitigating the vibration of the structure by making the fluid mass drag behind the structure's mass. This, in turn, reduces the gain of resonance and generates a new overall vibrating system with increased overall structure damping.

Embodiments of the present invention can be constructed using one or more tubes or ducts to define the above described container 12. A number of illustrative embodiments will be described herein that demonstrate the principles of the present invention. The principle of vibration damping for each of the described embodiments is the same as explained above. However, it is to be understood that the present invention is not limited to the illustrated examples.

Figure 5:
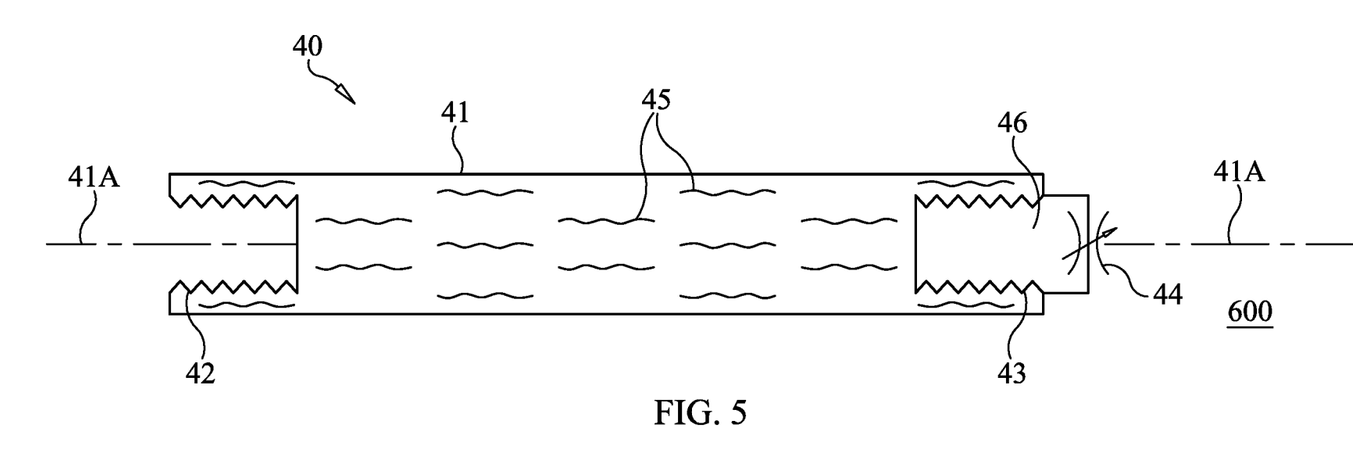
FIG. 5 is a schematic view of a single-duct, fluid-filled frequency-tunable vibration damper in accordance with an embodiment of the present invention.

Referring first to FIG. 5, a single-duct implementation of the above-described vibration damper 10 is shown and is referenced generally by numeral 40. Vibration damper 40 includes a rigid-wall duct 41 having a longitudinal axis 41A. Disposed at each axial end of rigid-wall duct 41 is a compliant end wall. More specifically, one end wall includes a bellows 42 sealing duct 41 but in open fluid communication with an ambient atmosphere 600, while the axially-opposing end wall includes a bellows 43 sealing duct 41 and that includes a flow restrictor 44 that defines a gas flow path between the inside of bellows 43 and ambient atmosphere 600. The combination of rigid-wall duct 41 and bellows 42/43 define a sealed container that is completely filled with a fluid 45. A gas 46 is contained within bellows 43 with gas 46 and gas in ambient atmosphere 600 passing through flow restrictor 44 with the contraction/expansion of bellows 43.

Figure 6:
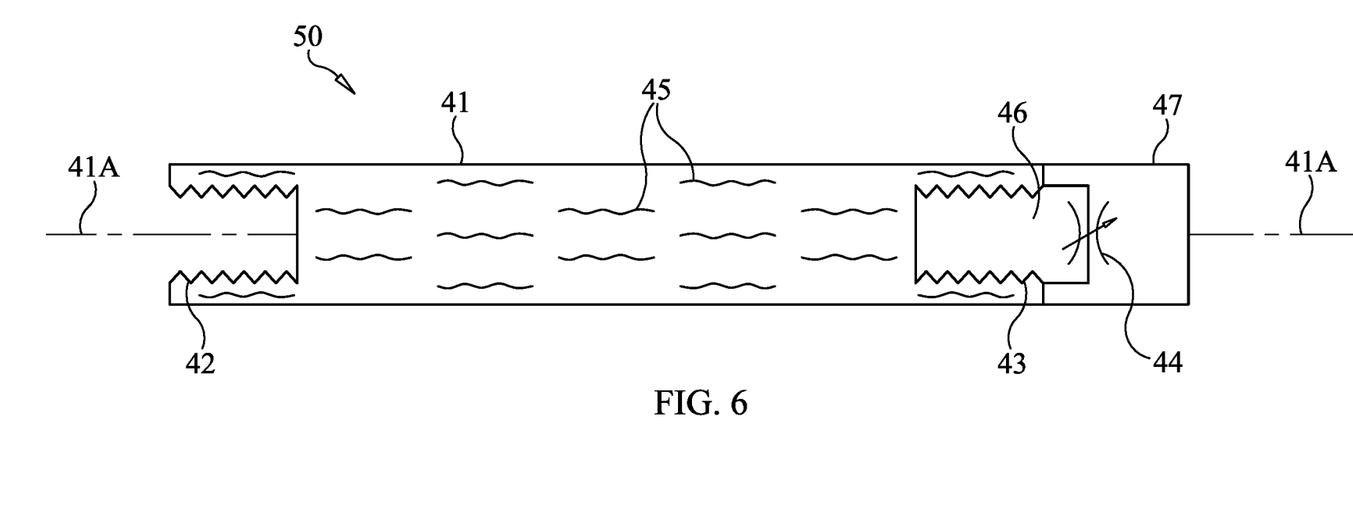
FIG. 6 is a schematic view of a single-duct, fluid-filled frequency-tunable vibration damper in accordance with another embodiment of the present invention.

Referring next to FIG. 6, a single-duct implementation of the above-described vibration damper 30 is shown and is referenced generally by numeral 50. Vibration damper 50 includes the elements of vibration damper 40 with a sealed chamber 47 coupled to duct 41 and containing gas 46 that will pass back-and-forth between the inside of bellows 43 and sealed chamber 47 via flow restrictor 44.

Figure 7:
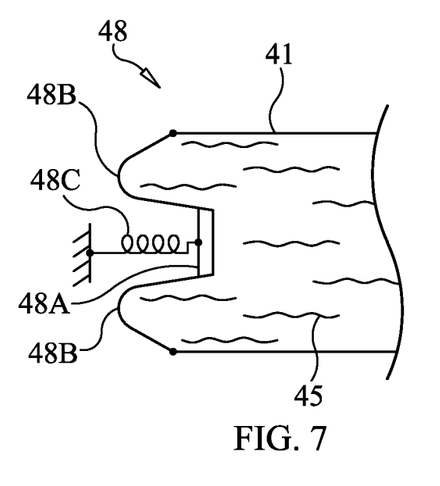
FIG. 7 is a partial view of a duct illustrating a compliant wall region realized by a rolling diaphragm in accordance with another embodiment of the present invention.
Figure 8:
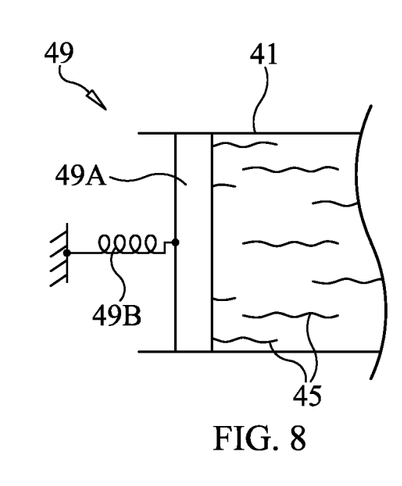
FIG. 8 is a partial view of a duct illustrating a compliant wall region realized by spring-loaded piston in accordance with another embodiment of the present invention.

Compliant walls in the present invention are not limited to the use of bellows or bellows-like devices. For example, FIG. 7 illustrates one axial end of rigid-wall duct 41 whose compliant wall is defined by a rolling diaphragm 48 that is illustrated schematically. Briefly and as is known in the art, rolling diaphragm 48 includes a rigid center plate 48A, an annular flexible ring 48B supporting plate 48A and coupled at its outer edges to duct 41, and a spring 48C that provides a restoring force needed to keep plate 48A and ring 48B in contact with fluid 45 at all times. Another example of a compliant wall construction is illustrated in FIG. 8 where the compliant wall at one axial end of rigid-wall duct 41 is defined by a spring-loaded piston 49. Briefly, piston 49 includes a piston body 49A slideable within duct 41 while providing a fluid seal therewith, and a spring 49B that provides a restoring force needed to keep piston body 49A in contact with liquid 45 at all times.

The present invention is not limited to single-duct embodiments. Indeed, one of the great advantages of the present invention is its ability to be adapted to multiple-duct embodiments for use in applications subject to multiple vibration modes. A variety of non-limiting exemplary multi-duct embodiments are shown in FIGS. 9-13. In each of these embodiments, the ducts are interconnected to define the fluid-filled container as described above. Although not shown in the figures, it is to be understood that rigid-wall portion(s) of the duct(s) would be coupled to a structure whose vibration motions are to be damped. For simplicity of illustration, all compliant end walls in the illustrated examples are bellows with one of the bellows including a flow restrictor as described above for FIG. 5. However, it is to be understood that other types of compliant end walls could be used without departing from the scope of the present invention. It is to be further understood that a single vibration damper in accordance with the present invention could use multiple types of compliant walls without departing from the scope of the present invention. Each illustrated example includes a single gas flow restrictor for the tuning function previously described herein. However, it is to be understood that a vibration damper in accordance with the present invention could also utilize multiple gas flow restrictors without departing from the scope of the present invention.

Figure 9:
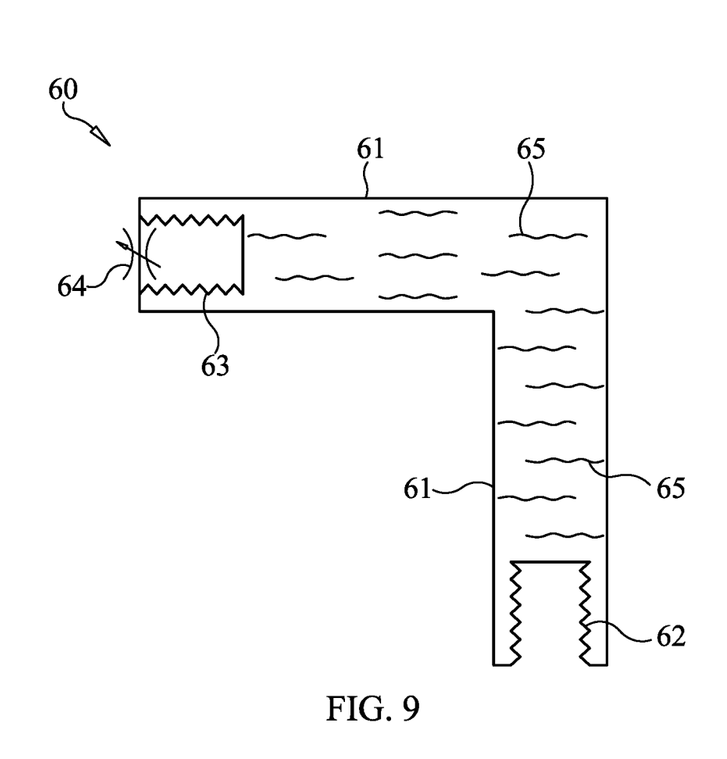
FIG. 9 is a schematic view of an L-shaped fluid-filled frequency-tunable vibration damper in accordance with another embodiment of the present invention.

Referring first to FIG. 9, an L-shaped fluid-filled frequency-tunable vibration damper 60 includes an L-shaped rigid-wall duct 61, a sealing bellows 62 at the outboard end of one of the legs of duct 61, and a sealing bellows 63 at the outboard end of the other leg of duct 61. Similar to the above-described bellows 43, bellows 63 includes a flow restrictor 64. Fluid 65 fills the sealed container defined by the combination of duct 61 and bellows 62/63.

Figure 10:
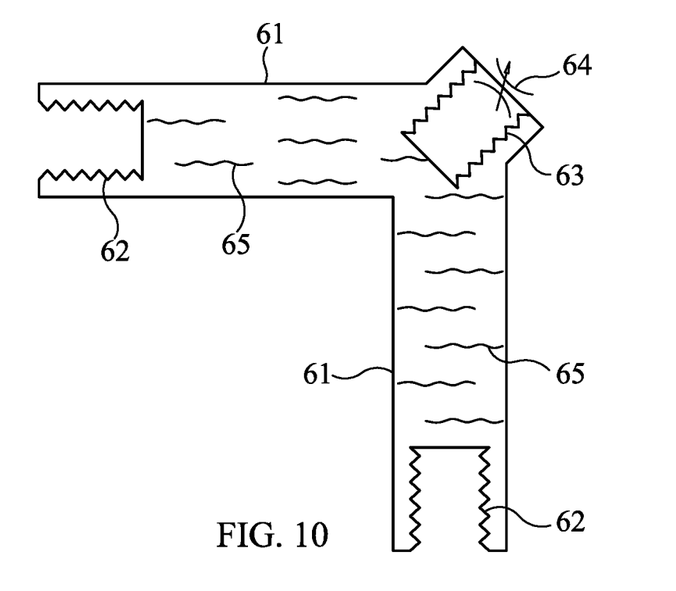
FIG. 10 is a schematic view of an L-shaped fluid-filled frequency-tunable vibration damper in accordance with yet another embodiment of the present invention.

FIG. 10 illustrates another L-shaped fluid-filled frequency-tunable vibration damper similar to vibration damper 60, but with an additional sealing bellows 63 at the vertex where the legs of duct 61 meet. The additional bellows 62 allows the vibration damping features provided by the legs of duct 61 to operate somewhat independently of one another.

Figure 11:
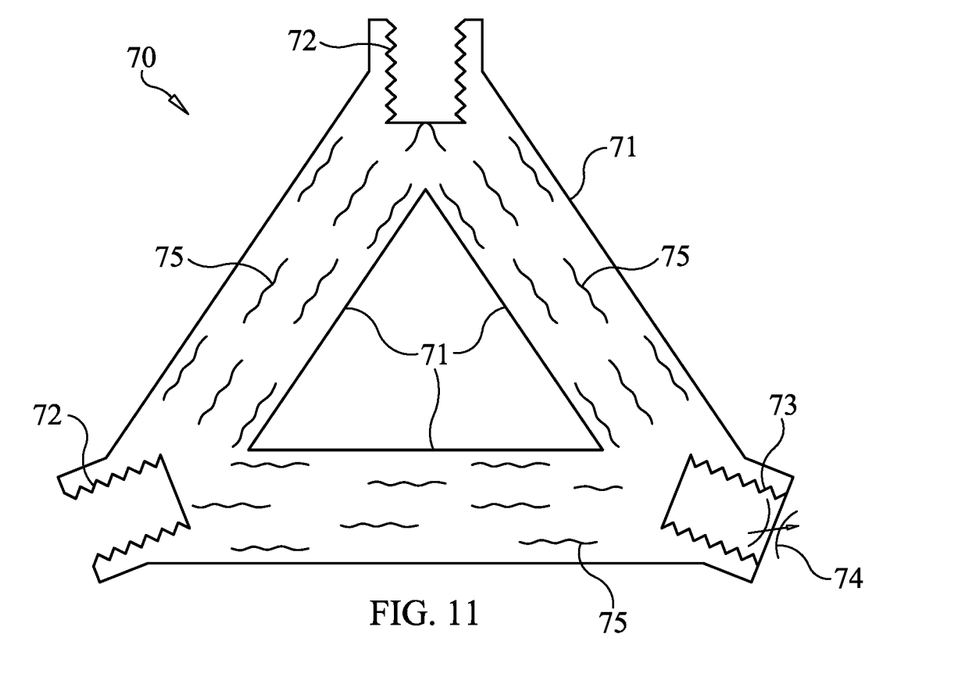
FIG. 11 is a schematic view of a triangular-shaped fluid-filled frequency-tunable vibration damper in accordance with still another embodiment of the present invention.

For structures that can experience multiple vibration modes, the present invention can be adapted to use a variety of different inter-connected duct arrangements. For example, FIG. 11 illustrates a fluid-filled frequency tunable vibration damper 70 having rigid-wall ducts 71 interconnected and arranged in a triangular configuration. Vertices of the triangular arrangement include a compliant wall structure such as sealing bellows 72 or sealing bellows 73 that includes a flow restrictor 74. Fluid 75 fills the sealed container defined by the combination of ducts 71 and bellows 72/73.

Figure 12:
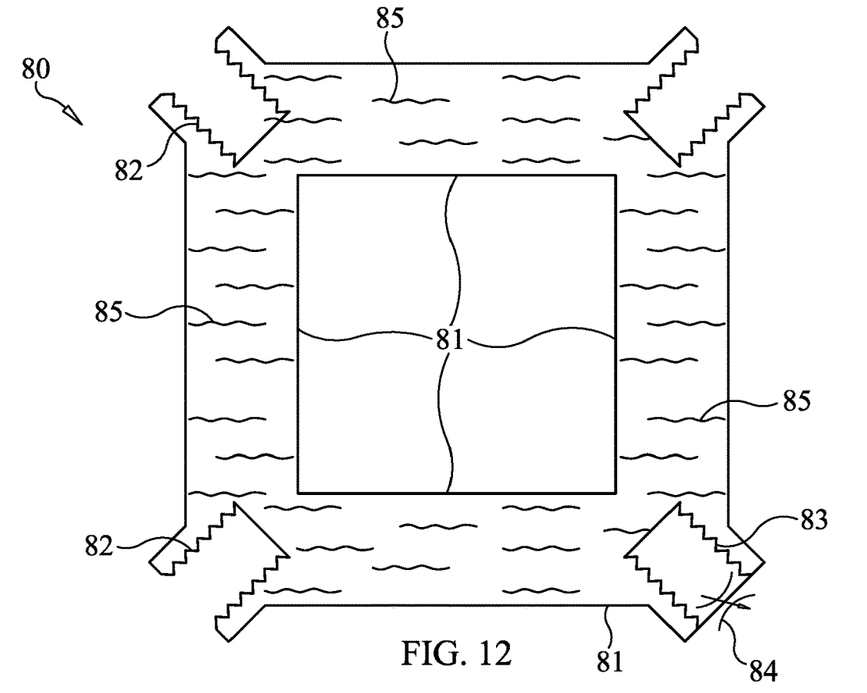
FIG. 12 is a schematic view of a rectangular-shaped fluid-filled frequency-tunable vibration damper in accordance with another embodiment of the present invention.

FIG. 12 illustrates a fluid-filled frequency-tunable vibration damper 80 having rigid-wall ducts 81 arranged in a rectangular configuration. Vertices of the rectangular arrangement include a compliant wall structure such as a sealing bellows 82 or sealing bellows 83 that includes a flow restrictor 84. Fluid 85 fills the sealed container defined by the combination ducts 81 and bellows 82/83.

Figure 13:
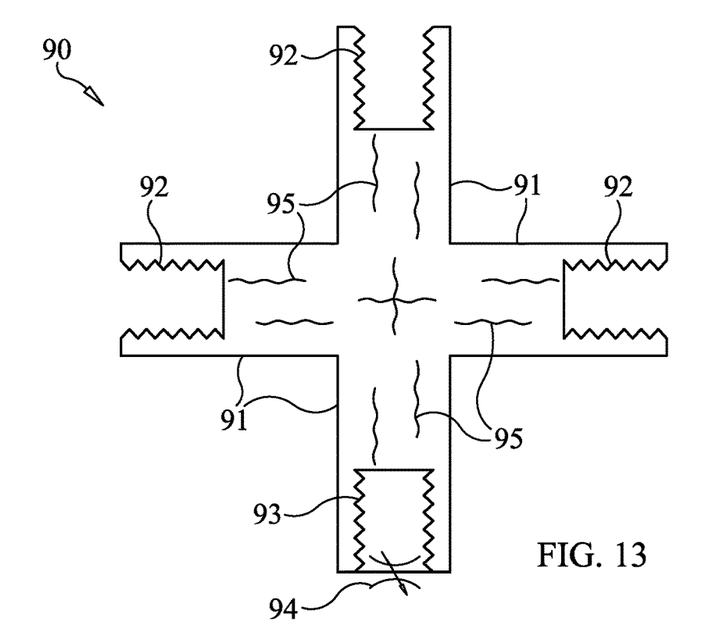
FIG. 13 is a schematic view of a cross-shaped fluid-filled frequency-tunable vibration damper in accordance with yet another embodiment of the present invention.

FIG. 13 illustrates a fluid-filled frequency tunable vibration damper 90 having rigid-wall ducts 91 arranged in a cross arrangement. Outboard ends of the cross-arrangement include a compliant wall structure such as a sealing bellows 92 or a sealing bellows 93 that includes a flow restrictor 94. Fluid 95 fills the sealed container defined by the combination of ducts 91 and bellows 92/93.

The advantages of the present invention are numerous. The vibration damper can be constructed and tuned to work with a variety of structures over a variety of vibration modes. Frequency tuning can be achieved without structural changes to the vibration damper thereby making the present invention an extremely cost-effective approach to structural vibration damping.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A frequency-tunable vibration damper, comprising:
    a first container having rigid wall regions and compliant wall regions, wherein at least a portion of said rigid wall regions is adapted to be coupled to a structure;
    a second container coupled to said first container, wherein a wall region of said second container includes one of said compliant wall regions;
    a liquid filling said first container;
    a gas filling said second container, wherein said gas is isolated from said liquid; and
    a flow restrictor included in said second container and spaced-apart from said one of said compliant wall regions, said flow restrictor defining a gas flow path between an inside of said second container and an ambient atmosphere outside of said second container.

2. A frequency-tunable vibration damper as in claim 1, wherein said flow restrictor includes an adjustable valve.

3. A frequency-tunable vibration damper as in claim 1, wherein said first container comprises a duct having a longitudinal axis, wherein said compliant wall regions comprise a first compliant wall region and a second compliant wall region, and wherein said first compliant wall region and said second compliant wall region are aligned along said longitudinal axis.

4. A frequency-tunable vibration damper as in claim 1, wherein said first container comprises a plurality of interconnected ducts angularly disposed with respect to one another.

5. A frequency-tunable vibration damper as in claim 1, wherein each of said compliant wall regions is selected from the group consisting of a bellows, a rolling diaphragm, and a spring-loaded piston.

6. A frequency-tunable vibration damper, comprising:
    a first container having of at least one longitudinally-extending duct, said first container having rigid wall regions and compliant wall regions, wherein at least a portion of said rigid wall regions is adapted to be coupled to a structure;
    a second container coupled to said first container, wherein a wall region of said second container includes one of said compliant wall regions;
    a liquid completely filling said first container, wherein movement of said liquid causes movement of said compliant wall regions;
    a gas filling said second container, wherein said gas is isolated from said liquid; and
    a flow restrictor included in said second container and spaced-apart from said one of said compliant wall regions, wherein said movement of said liquid causes movement of said gas through said flow restrictor, said flow restrictor defining a gas flow path between an inside of said second container and an ambient atmosphere outside of said second container.

7. A frequency-tunable vibration damper as in claim 6, wherein said flow restrictor comprises an adjustable valve.

8. A frequency-tunable vibration damper as in claim 6, wherein said at least one longitudinally-extending duct comprises a single duct having a longitudinal axis, wherein said compliant wall regions comprise a first compliant wall region and a second compliant wall region, and wherein said first compliant wall region and said second compliant wall region are aligned along said longitudinal axis.

9. A frequency-tunable vibration damper as in claim 6, wherein said at least one longitudinally-extending duct comprises a plurality of interconnected ducts angularly disposed with respect to one another.

10. A frequency-tunable vibration damper as in claim 6, wherein each of said compliant wall regions is selected from the group consisting of a bellows, a rolling diaphragm, and a spring-loaded piston.

11. A frequency-tunable vibration damper, comprising:
    a first container having rigid wall regions and compliant wall regions, wherein at least a portion of said rigid wall regions is adapted to be coupled to a structure;
    a second container coupled to said first container, wherein a wall region of said second container includes one of said compliant wall regions;
    a liquid completely filling said first container, wherein movement of said liquid causes movement of said compliant wall regions, said liquid being selected from the group consisting of water and mixtures that include water;
    a gas filling said second container, wherein said gas is isolated from said liquid; and
    a flow restrictor included in said second container and spaced-apart from said one of said compliant wall regions, said flow restrictor defining a gas flow path between an inside of said second container and an ambient atmosphere outside of said second container.

12. A frequency-tunable vibration damper as in claim 11, wherein said flow restrictor includes an adjustable valve.

13. A frequency-tunable vibration damper as in claim 11, wherein said first container comprises a duct having a longitudinal axis, wherein said compliant wall regions comprise a first compliant wall region and a second compliant wall region, and wherein said first compliant wall region and said second compliant wall region are aligned along said longitudinal axis.

14. A frequency-tunable vibration damper as in claim 11, wherein said first container comprises a plurality of interconnected ducts angularly disposed with respect to one another.

15. A frequency-tunable vibration damper as in claim 11, wherein each of said compliant wall regions is selected from the group consisting of a bellows, a rolling diaphragm, and a spring-loaded piston.

* * * * *